(12) United States Patent
Vook et al.

(10) Patent No.: US 8,193,971 B2
(45) Date of Patent: Jun. 5, 2012

(54) ANTENNA RECIPROCITY CALIBRATION

(75) Inventors: Frederick W. Vook, Schaumburg, IL (US); Nicholas E. Buris, Deer Park, IL (US); Bruce D. Mueller, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 476 days.

(21) Appl. No.: 12/267,745

(22) Filed: Nov. 10, 2008

(65) Prior Publication Data
US 2010/0117890 A1 May 13, 2010

(51) Int. Cl.
G01S 7/40 (2006.01)
H01Q 3/00 (2006.01)
G01S 7/02 (2006.01)

(52) U.S. Cl. ........ 342/174; 342/165; 342/173; 342/175; 342/195; 342/368; 342/377

(58) Field of Classification Search .......... 342/165–175, 342/195, 368–384, 73–81
See application file for complete search history.

(56) References Cited

U.S. PATENT DOCUMENTS

| | | | |
|---|---|---|---|
| 5,274,844 A | 12/1993 | Harrison et al. | |
| 5,530,449 A * | 6/1996 | Wachs et al. | 342/174 |
| 5,546,090 A | 8/1996 | Roy, III et al. | |
| 5,929,809 A * | 7/1999 | Erlick et al. | 342/372 |
| 5,929,810 A * | 7/1999 | Koutsoudis et al. | 342/373 |
| 6,037,898 A | 3/2000 | Parish et al. | |
| 6,157,343 A * | 12/2000 | Andersson et al. | 342/371 |
| 6,307,882 B1 | 10/2001 | Marzetta | |
| 6,339,399 B1 * | 1/2002 | Andersson et al. | 342/372 |
| 6,480,153 B1 * | 11/2002 | Jung et al. | 342/368 |
| 6,570,527 B1 | 5/2003 | Lindskog et al. | |
| 6,600,445 B2 * | 7/2003 | Li | 342/368 |
| 6,615,024 B1 | 9/2003 | Boros et al. | |
| 6,654,590 B2 | 11/2003 | Boros et al. | |
| 7,098,847 B2 * | 8/2006 | Li | 342/368 |
| 7,102,569 B2 * | 9/2006 | Tan et al. | 342/368 |
| 7,209,078 B2 * | 4/2007 | Jin et al. | 342/368 |
| 7,362,266 B2 * | 4/2008 | Collinson | 342/372 |

(Continued)

FOREIGN PATENT DOCUMENTS
WO 9534103 12/1995

OTHER PUBLICATIONS

Bourdoux, Andre et al.: "Non-reciprocal Transceivers in OFDM/SDMA Systems: Impact and Mitigation", T2B.5, RAWCON 2003, 0-7803-7829-6/03, pp. 183-186.

(Continued)

Primary Examiner — Bernarr E Gregory

(57) ABSTRACT

A method and a system for calibrating at least one antenna ($1,1$–$1,3$. $1,j$). At least a first antenna ($1,4$) within a first antenna array (102) can be selected as a primary reference antenna. At least one antenna ($4,3$) that is not within the first antenna array can be selected as a secondary reference antenna. At least a first signal propagation characteristic (122) can be measured based on at least one signal wirelessly communicated between the primary reference antenna and the secondary reference antenna. At least a second signal propagation characteristic (118) can be measured based on at least one signal wirelessly communicated between the secondary reference antenna and at least a second antenna ($1,2$) within the first antenna array. At least a first calibration coefficient can be determined for the second antenna.

16 Claims, 3 Drawing Sheets

U.S. PATENT DOCUMENTS

| | | | |
|---|---|---|---|
| 7,409,191 B2 | 8/2008 | Azuma | |
| 2002/0089447 A1* | 7/2002 | Li | 342/368 |
| 2005/0239506 A1* | 10/2005 | Li | 342/368 |
| 2006/0044185 A1* | 3/2006 | Jin et al. | 342/368 |
| 2006/0119511 A1* | 6/2006 | Collinson | 342/368 |
| 2008/0198066 A1 | 8/2008 | Kang et al. | |

OTHER PUBLICATIONS

Sakaguchi, Kei et al.: "Comprehensive Calibration for MIMO System", WPMC 2002, vol. 2, 0-7803-7442-8/02, pp. 440-443.

Liu, Jian et al.: "A Novel and Low-cost Analog Front-end Mismatch Calibration Scheme for MIMO-OFDM WLANs", WE2A-3, RWS 2006, Jan. 17-19, 2006, 0-7803-9412-7/06 IEEE, pp. 219-222.

Choi, Won-Joon et al.: "Circuit Implications of MIMO Technology for Advanced Wireless Local Area Networks", RM03A-1, 2004 IEEE Radio Frequency Integrated Circuits Symposium, pp. 185-188.

Guey, Jiann-Ching et al.: "Modeling and Evaluation of MIMO Systems Exploiting Channel Reciprocity in TDD Mode", VTC 2004 Fall, vol. 6, Sep. 26-29, 2004, pp. 4265-4269.

Liu, Jian et al.: "OFDM-MIMO WLAN Ap Front-end Gain and Phase Mismatch Calibration", T2A.2, RWS 2004, 0-7803-8451-2/04, pp. 151-154.

Bruhl, Lars et al.: "Invenstigation of Front-End Requirements for MIMO-Systems Using Downlink Pre-Distortion", PMC 2003, 2003 The Institution of Electrical Engineers, Printed and Published by the IEEE, Michael Faraday House, Six Hill Way, Stevenage SG1 2AY, pp. 472-476.

Hyun-Woong Sohn, "Corresponding Application PCT/US2009/061230—PCT International Search Report and Written Opinion," WIPO, ISR/KR, Korean Intellectual Property Office, Daejeon, Republic of Korea, Jun. 3, 2010, 10 pages, most relevant pp. 6 and 10.

\* cited by examiner

ANTENNA RECIPROCITY CALIBRATION

BACKGROUND OF THE INVENTION

1. Field of the Invention

The present invention generally relates to antenna arrays and, more particularly, to the calibration of antenna arrays.

2. Background of the Invention

Modern RF communication systems often include antenna arrays, which generally improve their wireless communication performance and capacity. In an antenna array, a plurality of antennas are spatially arranged and their respective transceivers are electrically connected via a feed network so as to cooperatively transmit and/or receive RF signals using beamforming or other multi-antenna transmission and reception techniques. Beamforming enables an antenna array to achieve high gain and controlled beamwidth in desired directions, while minimizing transmission and reception of RF signals in other directions.

To implement beamforming in transmit mode, the same signal may be simultaneously applied to the transmit apparatus chain for each of the antennas of the antenna array, thereby creating an individual instance of the signal for each of the respective antennas. One or more of the signal instances may be processed, for example to adjust their respective phases and/or amplitudes, in order to achieve a desired radiation pattern. When using an antenna array in receive mode, the same RF signal can be detected by each of the antennas and propagated to respective receive apparatus chains for processing and combining. For example, receive beamforming can be implemented by adjusting the phase and/or amplitude of one or more of these signal instances to result in a desired reception pattern when the individual signal instances are combined during receive processing.

The accuracy of an antenna array's beamforming characteristics typically depends on the accuracy of the knowledge of the characteristics of the antenna array's transmit/receive apparatus chains, as well as environmental conditions through which the RF signals are wirelessly transmitted. Thus, to insure proper operation, antenna arrays oftentimes are calibrated using a dedicated calibration transceiver to generate calibration coefficients for each antenna to compensate for variations in signal propagation mediums, including the transmit/receive apparatus chains and the wireless medium(s). The respective calibration coefficients then may be applied to the RF signal instances that are sent to, or received from, corresponding antennas. Typically, the calibration coefficients are applied during signal baseband processing.

SUMMARY OF THE INVENTION

The present invention relates to a method and a system for calibrating at least one antenna. The method can include selecting as a primary reference antenna at least a first antenna within a first antenna array and selecting as a secondary reference antenna at least one antenna that is not within the first antenna array. The method further can include measuring at least a first signal propagation characteristic based on at least one signal wirelessly communicated between the primary reference antenna and the secondary reference antenna, and measuring at least a second signal propagation characteristic based on at least one signal wirelessly communicated between the secondary reference antenna and at least a second antenna within the first antenna array. At least a first calibration coefficient can be determined for the second antenna within the first antenna array based on at least the first signal propagation characteristic and the second signal propagation characteristic. The first calibration coefficient can be output.

The present invention also relates to an antenna reciprocity calibrator. The antenna reciprocity calibrator can include a processor that selects as a primary reference antenna at least a first antenna within a first antenna array. The processor also can select as a secondary reference antenna at least one antenna that is not within the first antenna array. In addition, the processor can measure at least a first signal propagation characteristic based on at least one signal wirelessly communicated between the primary reference antenna and the secondary reference antenna, and measure at least a second signal propagation characteristic based on at least one signal wirelessly communicated between the secondary reference antenna and at least a second antenna within the first antenna array. The processor also can determine at least a first calibration coefficient for the second antenna within the first antenna array based on at least the first signal propagation characteristic and the second signal propagation characteristic.

Yet another embodiment of the present invention can include a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which.

DETAILED DESCRIPTION

Figure 1:
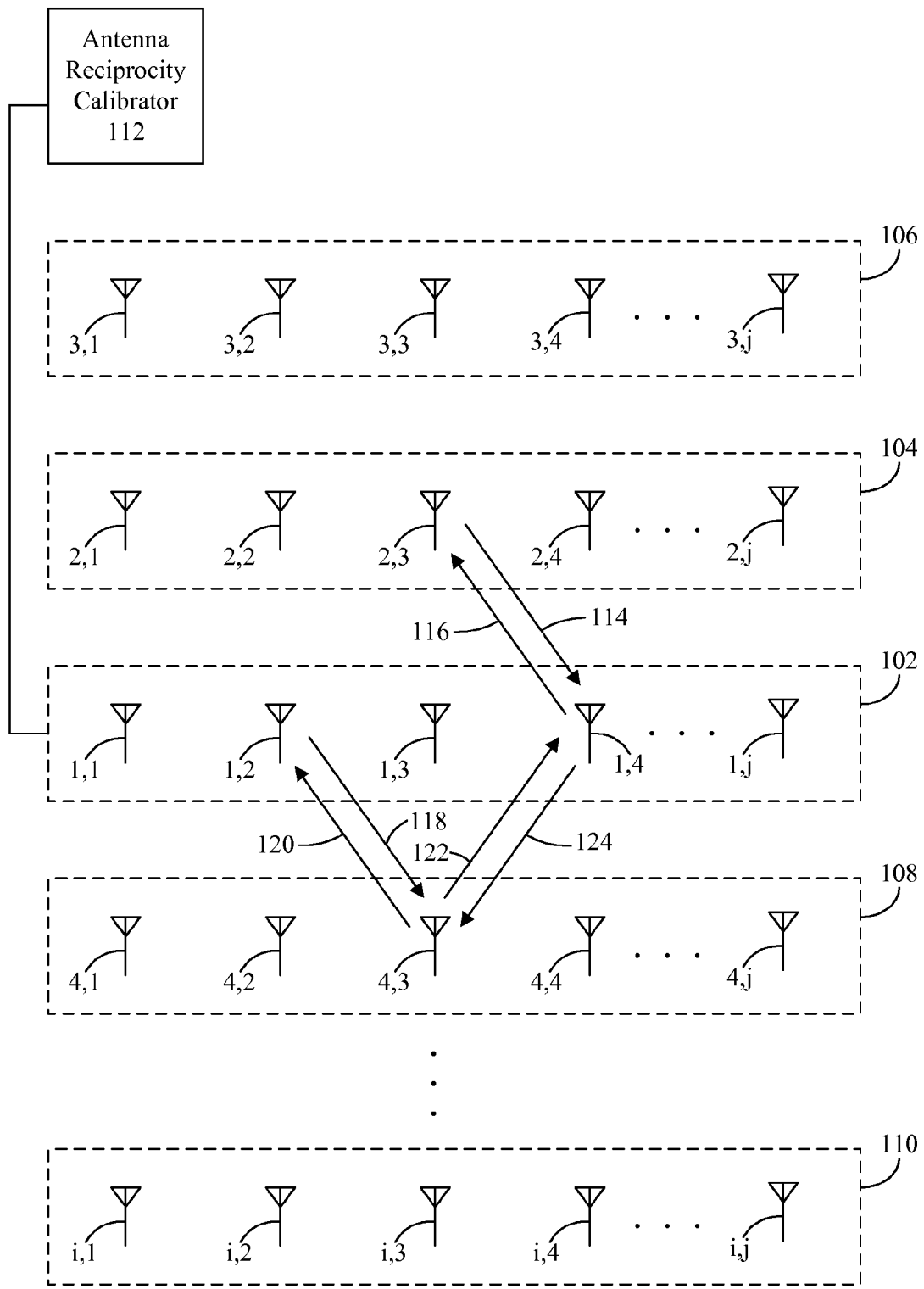
FIG. 1 depicts a communication system that is useful for understanding the present invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to a method and a system for calibrating one or more antennas within an antenna array in a manner that does not require the use of a dedicated calibration transceiver to generate calibration coefficients. For instance, in lieu of a dedicated calibration transceiver, a first antenna within the antenna array can be selected as a primary reference antenna for use in calibrating other antennas, including those within the antenna array and those not within the antenna array.

For example, a calibration coefficient can be assigned to the primary reference antenna, and the calibration coefficients for the other antennas being calibrated can be normalized with respect to this calibration coefficient. The normalized calibration coefficients then can be used by the transmit and/or receive apparatus chains of the respective antennas to calibrate transmit and/or receive signals to insure optimum transmit/receive characteristics, for instance while implementing beamforming with an antenna array that leverages uplink/downlink reciprocity in time division duplex communication systems.

For those antennas that are within the same antenna array as the primary reference antenna, calibrating such antennas through direct communication with the reference antenna may not be practical; the antennas may be in transmit mode when the primary reference antenna is transmitting and may be in receive mode when the primary reference antenna is receiving. To overcome this calibration obstacle, a secondary reference antenna can be selected, and propagation characteristics between the secondary reference and the antenna being calibrated can be measured. Propagation characteristics between the primary and secondary reference antennas also can be measured. The desired calibration coefficients then can be determined by processing both sets of propagation characteristics.

As used herein, the term "antenna array" means a group of a plurality of antennas that operate collaboratively to receive and process signals that are being received and/or to process and transmit signals that are being transmitted. As such, an antenna array also may include a transmit apparatus chain and/or a receive apparatus chain for each of the antennas within the antenna array. The term antenna array therefore may encompass multiple antenna configurations that perform closed-loop multiple input multiple output (MIMO) transmission in which signals fed to the transmitters on each antenna of the array are adjusted via methods known in the art to optimize the transmitted energy according to some known optimization criteria. Such methods can include, but are not limited to, linear precoding, non-linear precoding, transmit beamforming, transmit spatial division multiple access (SDMA), single-user MIMO, multi-user MIMO, etc. The term antenna array also may encompass configurations with multiple antennas that perform MIMO reception either in single-user form or multi-user form.

FIG. 1 depicts a communication system 100 that is useful for understanding the present invention. The communication system 100 can include at least one antenna array 102 comprising two or more antennas, for instance antennas 1,1, 1,2, 1,3, 1,4 . . . 1,$j$. The communication system 100 also can include one or more additional antennas. For example, the communication system 100 can include one or more antenna arrays 104, 106, 108, 110. One or more of the antenna arrays 104-110 can be components of a base transceiver station that also comprises the antenna array 102, but this need not be the case. Indeed, the antenna arrays 104-110 also may be components of one or more other base transceiver stations, or components of one or more other wireless communication systems, for example mobile stations (e.g. mobile radios, mobile telephones, personal digital assistants, mobile computers and the like). In the present example, the antenna array 104 can include antennas 2,1, 2,2, 2,3, 2,4 . . . 2,$j$, the antenna array 106 can include antennas 3,1, 3,2, 3,3, 3,4 . . . 3,$j$, the antenna array 108 can include antennas 4,1, 4,2, 4,3, 4,4 . . . 4,$j$, the antenna array 110 can include antennas i,1, i,2, i,3, i, 4 . . . i,$j$, and so on. Notwithstanding, it should be noted that the additional antenna need not be a component of an antenna array that comprises a plurality of antenna elements.

Each of the antennas 1,1-i,$j$ can be operatively linked to a respective transmit apparatus chain for transmitting respective signals and/or signal instances, and a respective receive apparatus chain for receiving respective signals and/or signal instances, as will be described. As used herein, the term "signal instance" means a particular occurrence of a signal for which there are additional occurrences. For example, during transmit mode, each of the antennas 1,1-1,$j$ of the antenna array 102 can transmit a respective signal instance of the same signal, although the phase and/or amplitude of different signal instances may be varied to achieve a particular radiation pattern, for instance when beamforming transmit signals. Similarly, during receive mode, each of the antennas 1,1-1,$j$ of the antenna array 102 can receive a respective signal instance of the same signal, and these signal instances may be processed and combined to achieve a particular purpose, such as detecting and decoding a transmitted signal or signals, rejecting interference, etc.

In this regard, each of the antennas 1,1-1,$j$ of the antenna array 102 may operate in the same state (e.g. transmit or receive) when the antennas 1,1-1,$j$ are in operation. Nonetheless, one or more of the antennas 1,1-1,$j$ also may be selectively turned off, for example when they are not needed or when maintenance is being performed, while other antennas 1,1-1,$j$ of the antenna array 102 can remain in operation.

The communication system 100 also can include an antenna reciprocity calibrator 112. The antenna reciprocity calibrator 112 can interface with the antenna array 102 to implement the calibration processes described herein. In one arrangement, the antenna reciprocity calibrator 112 can be embodied as a component of the antenna array 102, for example as an application executed by a suitable processor/controller within the antenna array 102. In another arrangement, the antenna reciprocity calibrator 112 can be implemented within another device within the communication system 100, for instance within a base station controller, a mobile switching center, a network server, or any other system or device that may suitably communicate with the antenna array 102.

The antenna reciprocity calibrator 112 also can interface with one or more of the antenna arrays 104-110 or other systems to relay calibration information (e.g. calibration data, calibration requests, calibration responses, data pertaining to propagation characteristics, etc.), though this need not be the case. Alternatively, the antenna arrays 104-110 can receive necessary calibration requests, responses and data from the antenna array 102.

In operation, an antenna within the communication system 100 can be selected as a primary reference antenna for use in generating calibration coefficients for other antennas 1,1-i,$j$ within the communication system 100. For example, the antenna 1,4 of the antenna array 102 can be selected as the primary reference antenna. The primary reference antenna 1,4 can be selected by the antenna reciprocity calibrator 112, pre-selected as a primary reference antenna, or selected to be a primary reference antenna in any other suitable manner.

To generate calibration coefficients for the antennas 2,1-i,$j$ that are not components of the antenna array 102, signal propagation characteristics between the primary reference antenna 1,4 and the other antennas 2,1-i,$j$ can be measured and processed. Each of the generated calibration coefficients then can be normalized to a calibration coefficient assigned to the primary reference antenna 1,4 (e.g. a value of one). Such measurements and processing can be performed at the behest of the antenna reciprocity calibrator 112 and/or in response to one or more requests generated by the antenna reciprocity calibrator 112.

For instance, the antenna reciprocity calibrator 112 can initiate measurement of a bi-directional baseband channel response 114, 116 for one or more signals communicated between the primary reference antenna 1,4 and each of the other antennas 2,1-i,j. The respective calibration coefficients then can be determined by dividing baseband channel responses 114 as measured in one signal direction by baseband channel responses 116 as measured in the other signal direction, which is represented by the following equation:

$$\hat{C}_{i,j}(k) = \frac{H_t(k)}{H_r(k)}$$

where $\hat{C}_{i,j}(k)$ is the calibration coefficient for antenna i,j on a carrier or sub-carrier (k), $H_t(k)$ is the baseband channel response measured between the antenna i,j and the primary reference antenna 1,4 while the antenna i,j is transmitting a signal to the primary reference antenna 1,4, and $H_r(k)$ is the baseband channel response measured between the antenna i,j and the primary reference antenna 1,4 while the antenna i,j is receiving a signal from the primary reference antenna 1,4.

As an example, for the antenna 2,3, the first baseband channel response 114 ($H_{2,3;1,4}(k)$) can be measured while the antenna 2,3 transmits a signal to the antenna 1,4 using a carrier or sub-carrier (k). Further, the second baseband channel response 116 ($H_{1,4;2,3}(k)$) can be measured while the antenna 1,4 transmits a signal to the antenna 2,3 using the carrier or subcarrier (k). The calibration coefficient $\hat{C}_{1,2}(k)$ to be used by the antenna 2,3 while transmitting on the carrier or sub-carrier (k) then can be determined by the following equation:

$$\hat{C}_{1,2}(k) = \frac{H_{2,3;1,4}(k)}{H_{1,4;2,3}(k)}.$$

Processing of data to determine the baseband channel responses 114, 116 can be implemented by the antenna reciprocity calibrator 112, a signal processing system associated with the primary reference 1,4 and/or a signal processing system associated with the antenna 2,3. Such systems can communicate among one another as required to forward measured data. The measured data can be forwarded via wireless communication links and/or wired communication links. For example, a signal processing system associated with the antenna 2,3 can communicate measured data to the antenna reciprocity calibrator 112 or a processing system associated with the antenna 1,4. This communication can be performed via a wireless communication link and/or via a wired communication link, such as a network backbone system.

The skilled artisan will recognize that the baseband channel responses 114, 116 can be measured using any suitable techniques, such as those known in the art. For example, data pertaining to characteristics of signals prior to baseband processing can be compared to measured characteristics of such signals after the signals have been received and processed. For instance, the initial signal characteristics of a signal can be compared to the measured signal characteristics after the signal has been converted to a baseband signal, up converted to an RF signal and transmitted by an antenna over a wireless medium, received by another antenna and down converted back to a baseband signal, and retrieved from the baseband signal. In one arrangement, the transmitting antenna can provide to the receiving antenna the data pertaining to the initial signal characteristics. In another arrangement, data pertaining to the initial signal characteristics can be provided by the antenna reciprocity calibrator 112. In yet another arrangement, the data pertaining to the initial signal characteristic can be known a-priori by the receiving antenna.

As noted, in an arrangement in which the antennas 1,1-1,j within the antenna array 102 simultaneously transmit signals and simultaneously receive signals, calibrating the antennas 1,1-1,3, 1,j through direct communication with the reference antenna 1,4 may not be practical. For example, the transceivers associated with the antennas 1,1-1,j may be designed to either all be transmitting or all be receiving at any given time for various implementation expediencies. In accordance with arrangements described herein, one or more secondary reference antennas can be selected to facilitate calibration of the antennas 1,1-1,j using antenna reciprocity calibration. As used herein, the term "antenna reciprocity calibration" means the calibration of an antenna using calibration coefficients that are calculated to facilitate downlink transmission based on signals received on the uplink in a time division duplex (TDD) system.

This calibration of the antennas can be achieved by measuring a channel response between a primary reference antenna and a secondary reference antenna, measuring a channel response between the secondary reference antenna and an antenna being calibrated, and processing each of the channel responses to generate one or more calibration coefficients for the antenna being calibrated. As noted, the secondary reference antenna can be an antenna within another antenna array 104-110, although the invention is not limited in this regard and any other suitable antenna can be used as the secondary reference antenna.

Continuing with the previous example, the antenna 4,3 can be selected as the secondary reference antenna. The secondary reference antenna 4,3 can be selected by the antenna reciprocity calibrator 112, pre-selected as a secondary reference antenna, or selected to be a secondary reference antenna in any other suitable manner. It should be noted, however, that the secondary reference antenna 4,3 should be within communication range of the antenna 1,4 and of any of the antennas 1,1-1,3, 1,j for which the antenna 4,3 will be used to facilitate calibration.

To calibrate the antennas 1,1-1,3, 1,j, signal propagation characteristics between the secondary reference antenna 4,3 and the antennas 1,1-1,3, 1,j can be measured, as well as signal propagation characteristics between the primary reference antenna 1,4 and the secondary reference antenna 4,3. Both sets of signal propagation characteristics then can be processed to generate respective calibration coefficients, and the calibration coefficients can be normalized to the calibration coefficient assigned to the primary reference antenna 1,4. Such measurements and processing again can be performed by behest of the antenna reciprocity calibrator 112 and/or in response to one or more requests generated by the antenna reciprocity calibrator 112.

To generate these calibration coefficients, a bi-directional baseband channel response 118, 120 can be measured between each of the other antennas 1,1-1,j and the secondary reference antenna 4,3, and a bi-directional baseband channel response 122, 124 can be measured between the secondary reference antenna 4,3 and the primary reference antenna 1,4. The respective calibration coefficients then can be determined by dividing products of the baseband channel responses 118, 122 as measured in one direction by products of the baseband channel responses 120, 124 as measured in the other direction, which is represented by the following equation:

$$\hat{C}_{i,j}(k) = \frac{H_{t1}(k)H_{t2}(k)}{H_{r1}(k)H_{r2}(k)}$$

where $H_{r1}(k)$ is the baseband channel response measured between the antenna i,j and the secondary reference antenna 4,3 while the antenna i,j is transmitting a signal to the secondary reference antenna 4,3, $H_{r1}(k)$ is the baseband channel response measured between the antenna i,j and the secondary reference antenna 4,3 while the antenna i,j is receiving a signal from the secondary reference antenna 4,3, $H_{t2}(k)$ is the baseband channel response measured between the secondary reference antenna 4,3 and the primary reference antenna 1,4 while the secondary reference antenna 4,3 is transmitting a signal to the primary reference antenna 1,4, and $H_{r2}(k)$ is the baseband channel response measured between the secondary reference antenna 4,3 and the primary reference antenna 1,4 while the secondary reference antenna 4,3 is receiving a signal from the primary reference antenna 1,4.

By way of example, to determine a calibration coefficient for the antenna 1,2 while transmitting and/or receiving using a carrier or sub-carrier (k), a first baseband channel response 118 ($H_{1,2;4,3}(k)$) can be measured while the antenna 1,2 transmits a signal to the secondary reference antenna 4,3 on the carrier or sub-carrier (k), and a second baseband channel response 120 ($H_{4,3;1,2}(k)$) can be measured while the secondary reference antenna 4,3 transmits a signal to the antenna 1,2 on the carrier or sub-carrier (k). Similarly, a third baseband channel response 122 ($H_{4,3;1,4}(k)$) can be measured while the secondary reference antenna 4,3 transmits a signal to the primary reference antenna 1,4 on the carrier or sub-carrier (k), and a fourth baseband channel response 124 ($H_{1,4;4,3}(k)$) can be measured while the primary reference antenna 1,4 transmits a signal to the secondary reference antenna 4,3 on the carrier or sub-carrier (k). The calibration coefficient for the antenna 1,2 then can be determined by the following equation:

$$\hat{C}_{1,2}(k) = \frac{H_{1,2;4,3}(k)H_{4,3;1,4}(k)}{H_{4,3;1,2}(k)H_{1,4;4,3}(k)}$$

As noted, the measurements of the baseband channel response 118-124 can be implemented using any suitable techniques, such as those techniques known in the art.

Processing of data to determine the baseband channel responses 118-124 can be implemented by the antenna reciprocity calibrator 112, a signal processing system associated with the primary reference antenna 1,4, a signal processing system associated with the secondary reference antenna 4,3 and/or a signal processing system associated with the antenna 1,2. Moreover, such systems can communicate among one another as required to forward measured data, computed data, and the like.

Each of the baseband channel responses 114-122 can be a net response of the various propagation mediums through which a signal is propagated, including the transmit apparatus chain of the transmitting antenna, the wireless medium, and the receive apparatus chain of the receiving antenna. The response of the wireless medium can be influenced by the transmit antenna to wireless medium interface, the wireless medium to receive antenna interface, and characteristics of the wireless medium. The wireless medium characteristics can include, among other things, the effects of topography, obstacles and weather on wireless signals propagated between the transmit and receive antennas.

At this point it should be noted that while generating the calibration coefficients for the various antennas 1,1-1,3, 1,j of the antenna array 102, it is not required that the baseband channel responses 122, 124 between the secondary reference antenna 4,3 and the primary reference antenna 1,4 be re-measured for each of the antennas 1,1-1,3, 1,j. Instead, data for the baseband channel responses 122, 124 can be generated once, and this data can be used when generating calibration coefficients for each of the antennas 1,1-1,3, 1,j. Nonetheless, the invention is not limited in this regard.

In one arrangement, the calibration of each of the antennas 1,1-i,j can include determining transmission correction parameters that may be used to calibrate the antennas' transmit apparatus chains. For example, as noted, the calibration coefficient for an antenna i,j can be expressed by $$\hat{C}_{i,j}(k) = \frac{H_t(k)}{H_r(k)}.$$

Assuming the bi-directional channels between the antennas is time invariant during the calibration responses, it can be shown that this calibration coefficient is equal to the ratio of the complex response (gain and phase) of the transmit chain (baseband to RF) on antenna i,j divided by the complex gain of the receive chain (RF to baseband) on antenna i,j multiplied by a complex scalar coefficient that may the same for all antennas in the system. For the purposes of this example, the scalar coefficient can be neglected since it is anticipated that is will affect each antenna identically.

When an uplink channel response from a subscriber device is properly measured at baseband of receive antenna i,j, that uplink channel response is anticipated to be equal to the RF multipath channel multiplied by the complex gain of the receive chain on antenna i,j. However, downlink transmit beamforming weights generally are applied at baseband to the signal to be transmitted, which means that the downlink baseband channel response on antenna i,j being used from beamforming should be matched to be equal to the RF multipath channel multiplied by the complex gain of the transmit chain on antenna i,j.

Computing the beamforming weights based on the measured baseband uplink channel response channel, however, typically will result in suboptimum performance because the baseband uplink channel response usually is not equal to the baseband downlink channel response. The calibration coefficient for antenna i,j computed herein can be used to compute an estimate of the downlink baseband channel response for antenna i,j over which the beamforming will be performed. Accordingly, the beamforming weights can be computed based on this estimate to achieve optimum performance.

The estimate of the downlink baseband channel response for antenna i,j can be computed by multiplying the uplink calibration coefficient for antenna i,j by the measured uplink baseband channel response on antenna i,j. Multiplying an uplink channel estimate by the calibration coefficient generated in this manner to produce a downlink channel estimate is one example of performing reciprocity array calibration in accordance with the inventive arrangements described herein.

In another arrangement, the uplink signal may be multiplied by the calibration coefficient directly to produce a downlink-oriented version of the received uplink signal, and this downlink-oriented version of the uplink signal can be used to compute the communicate beamforming weights for use when transmitting data on the downlink.

In yet another arrangement, parameters or quantities computed based on uplink signals can be multiplied by the calibration coefficient to produce downlink-oriented versions of those parameters or quantities, and the transmit processing can be performed based on those downlink-oriented versions of the parameters or quantities. Examples of such parameters include a spatial covariance matrix computed based on the received uplink signal, and a spatial covariance matrix computed based on an estimate of the uplink channel response.

Figure 2:
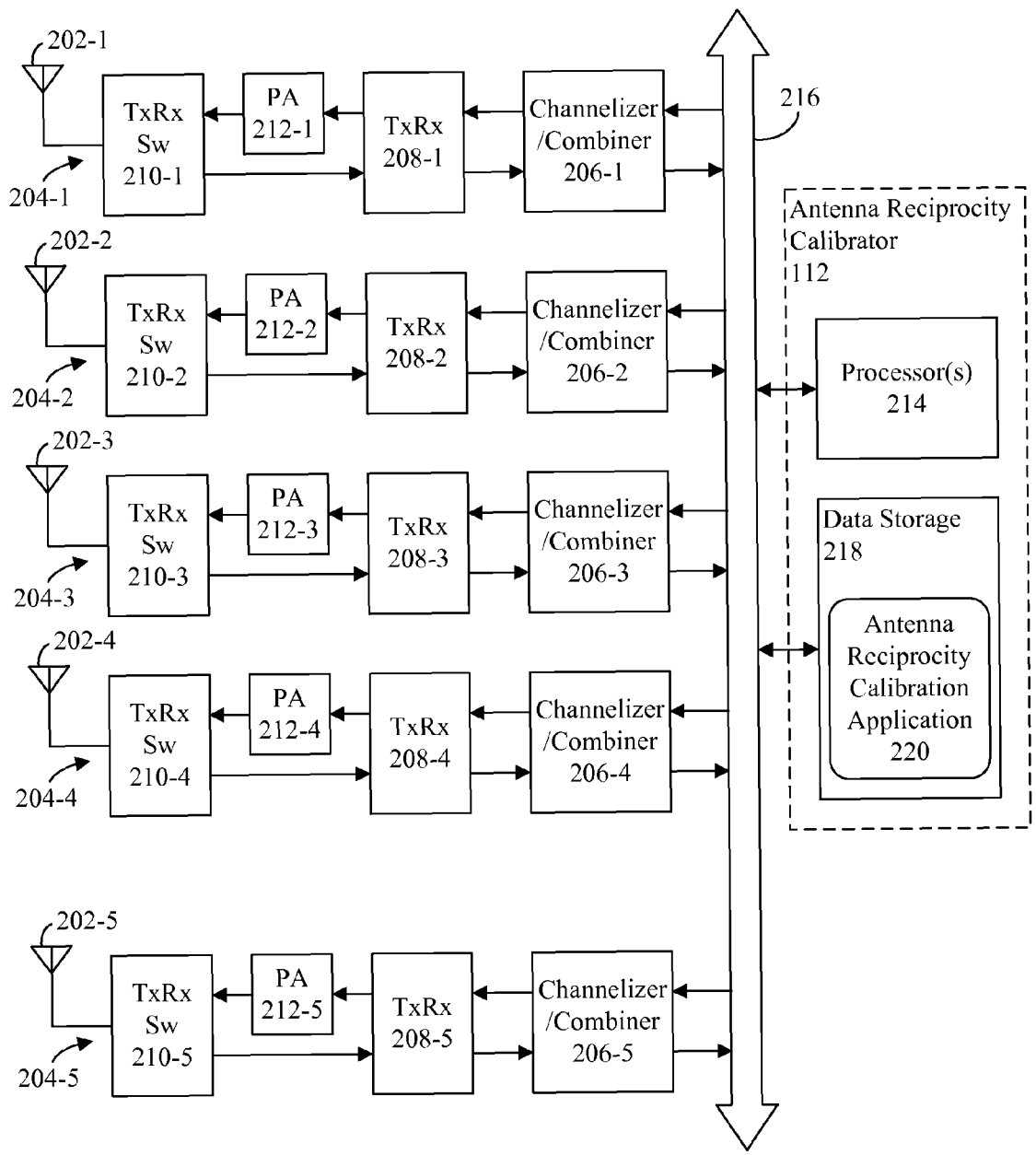
FIG. 2 depicts a block diagram of an antenna array that is useful for understanding the present invention.

FIG. 2 depicts a block diagram of an antenna array 200 that may be used to implement antenna reciprocity calibration. The antenna array 200 can include a plurality of antennas 202-1, 202-2, 202-3, 202-4, 202-5. The antenna array 200 further can include a transmit apparatus chain and a receive apparatus chain associated with each of the respective antennas 202, collectively identified as transmit/receive apparatus chains 204-1, 204-2, 204-3, 204-4, 204-5. By way of example, each transmit/receive apparatus chain 204 can comprise a respective channelizer/combiner 206-1, 206-2, 206-3, 206-4, 206-5, a respective transceiver 208-1, 208-2, 208-3, 208-4, 208-5, and a respective transmit/receive switch 210-1, 210-2, 210-3, 210-4, 210-5. In addition, an RF power amplifier 212-1, 212-2, 212-3, 212-4, 212-5 can be provided in each of the transmit apparatus chains. The transmit/receive apparatus chains 204 also may include additional components, and the invention is not limited in this regard.

The antennas 202 and the respective transmit/receive apparatus chains 204 can be configured to communicate in accordance with IEEE 802 wireless communications, for example, 802.11 and 802.16 (WiMAX), 3G, 4G, EUTRAN, UMB, WPA, WPA2, GSM, TDMA, CDMA, WCDMA, OFDM, LTE, and/or any other communications format. Still, the invention is not limited in this regard as the antennas 202 and the respective transmit/receive apparatus chains 204 can be configured to transmit and/or receive RF signals in accordance with any suitable communications standards, protocols, and/or architectures, or a suitable combination of such standards, protocols, and/or architectures.

The antenna array 200 also can include a processor 214, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The processor 214 can be communicatively linked to the transmit/receive apparatus chains 204 via one or more suitable communication links 216, for instance a communications bus. The processor 214 also can be communicatively linked to a data storage 218 via the communication link 216. The data storage 218 can include one or more storage devices, each of which may include, but is not limited to, a magnetic storage medium, an electronic storage medium, an optical storage medium, a magneto-optical storage medium, and/or any other storage medium suitable for storing digital information. In an alternate arrangement, the data storage 218 can be integrated into the processor 214, though this need not be the case.

An antenna reciprocity calibration application 220 can be stored on the data storage 218 or otherwise made accessible to the processor 214. The antenna reciprocity calibration application 220 can be executed by the processor 214 to implement the methods and processes described herein that are performed by the antenna array 200. Optionally, the antenna reciprocity calibration application 220 can be executed by the processor 214 to also implement the methods and processes described herein that are performed by the antenna reciprocity calibrator. In such case, the antenna reciprocity calibrator 112 can comprise the processor 214 and the antenna reciprocity calibration application 220.

For example, the processor 214 can execute the antenna reciprocity calibration application 220 to select a primary reference antenna, select a secondary reference antenna, measure signal propagation characteristics between the primary reference antenna and other antennas, determine calibration coefficients, assign one or more normalized calibration coefficients to the primary reference antenna, normalize computed calibration coefficients, and so on. The processor 214 also can execute the antenna reciprocity calibration application 220 to communicate to other systems (e.g. other antenna systems and/or antenna arrays) to implement such processes. For instance, the processor 214 can communicate requests, responses, data, or the like to other systems via one or more of the antennas 202 and transmit/receive apparatus chains 204.

In an alternate arrangement, the antenna reciprocity calibrator 112 can be stored on one or more other systems that are communicatively linked to the antenna array 200, as previously noted. In such an arrangement, the antenna array 200 may include another processor (not shown) and data storage (not shown), and such processor can execute a suitable application to respond to requests from the antenna reciprocity calibrator 112 to implement one or more of the methods and processes described herein that may be assigned to the antenna array 200.

Figure 3:
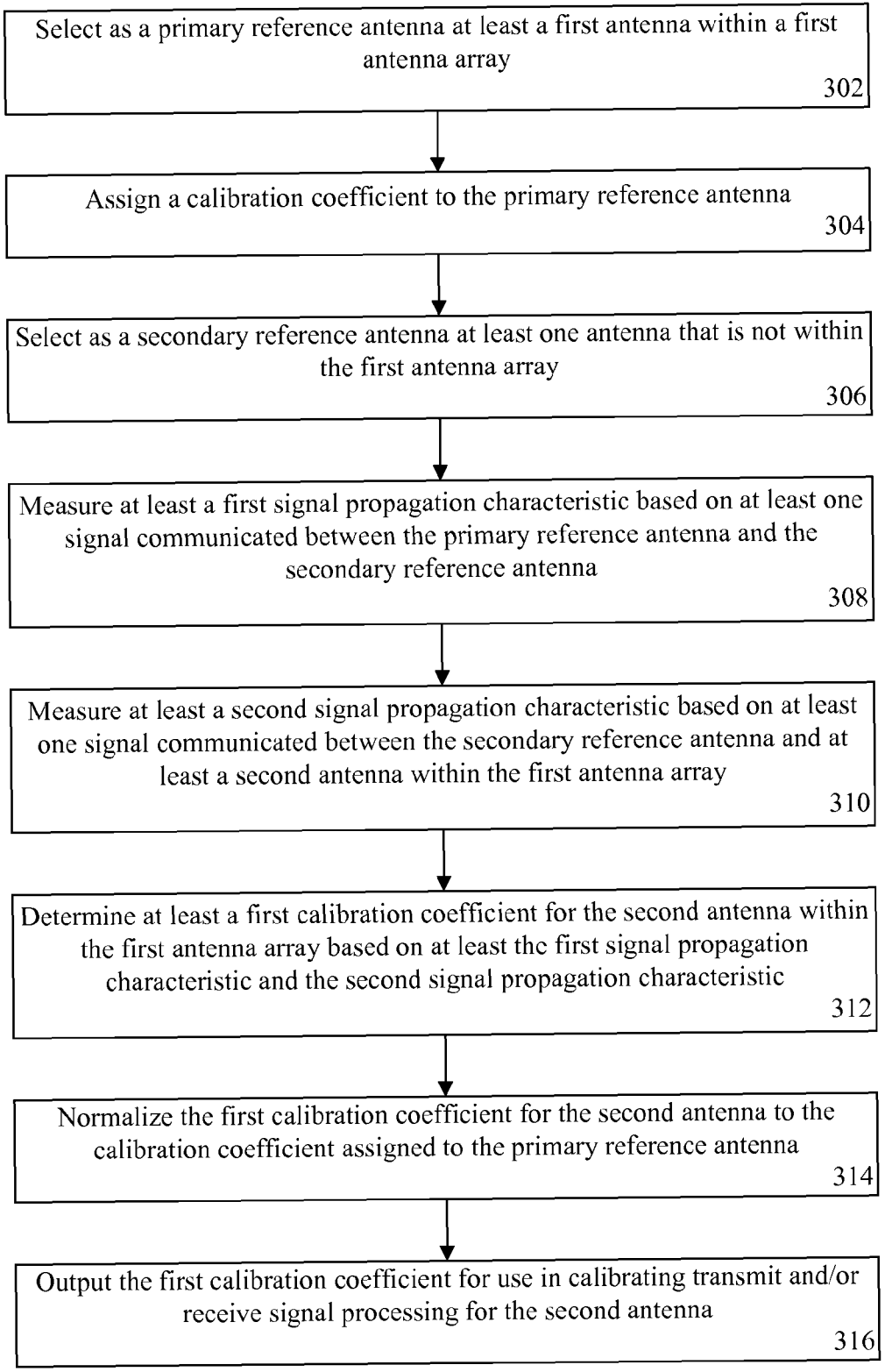
FIG. 3 is a flowchart presenting a method of antenna reciprocity calibration that is useful for understanding the present invention.

FIG. 3 is a flowchart presenting a method 300 of antenna reciprocity calibration, which may be implemented by and/or in response to one or more requests generated by the antenna reciprocity calibrator. For example, a processor of the antenna reciprocity calibrator can execute the antenna reciprocity calibration application as previously described to implement the method 300. In alternate arrangements, various tasks may be assigned by the antenna reciprocity calibrator to other devices or systems.

At step 302, at least a first antenna within a first antenna array can be selected as a primary reference antenna. At step 304, a calibration coefficient can be assigned to the primary reference antenna. For example, a value of one can be assigned to the calibration coefficient of the primary reference antenna. At step 306, at least one antenna that is not within the first antenna array can be selected as a secondary reference antenna. For example, the secondary reference antenna can be selected from a plurality of antennas within a second antenna array.

Continuing to step 308, at least a first signal propagation characteristic can be measured based on at least one signal communicated between the primary reference antenna and the secondary reference antenna, for instance over a wireless communication channel or over a wired communication channel. For example, a baseband response between the primary reference antenna and the secondary reference antenna can be measured. In one arrangement, a bi-directional baseband response between the primary reference antenna and the secondary reference antenna can be measured.

At step 310, at least a second signal propagation characteristic can be measured based on at least one signal communicated between the secondary reference antenna and at least a second antenna within the first antenna array. For instance, a baseband response can be measured between the secondary reference antenna and the second antenna within the first antenna array. One particular arrangement can include measuring a bi-directional baseband response between the secondary reference antenna and the second antenna within the first antenna array, although the invention is not limited such an arrangement.

Proceeding to step 312, at least a first calibration coefficient can be determined for the second antenna within the first antenna array based on at least the first signal propagation characteristic and the second signal propagation characteristic. At step 314 the first calibration coefficient for the second antenna can be normalized to the calibration coefficient assigned to the primary reference antenna. If the calibration coefficient assigned to the primary reference antenna is one, step 314 may not be necessary, however.

Continuing to step 316, the first calibration coefficient can be output for use in calibrating transmit and/or receive signal processing for the second antenna. As used herein, the terms "output" or "outputting" can include, but are not limited to, storing data in memory, writing to one or more files, presenting on a display or other output device, presenting an audible notification, sending or transmitting to another system, exporting, or the like.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of calibrating at least one antenna, the method comprising:
   selecting as a primary reference antenna at least a first antenna within a first antenna array;
   selecting as a secondary reference antenna at least one antenna that is not within the first antenna array;
   measuring at least a first signal propagation characteristic based on at least one signal wirelessly communicated between the primary reference antenna and the secondary reference antenna;
   measuring at least a second signal propagation characteristic based on at least one signal wirelessly communicated between the secondary reference antenna and at least a second antenna within the first antenna array;
   determining at least a first calibration coefficient for the second antenna within the first antenna array based on at least the first signal propagation characteristic and the second signal propagation characteristic; and
   calibrating signal processing of the second antenna, the calibrating based on the first calibration coefficient.

2. The method of claim 1 further comprising:
   assigning a calibration coefficient to the primary reference antenna.

3. The method of claim 2 further comprising:
   normalizing the first calibration coefficient for the second antenna to the calibration coefficient assigned to the primary reference antenna.

4. The method of claim 1 wherein measuring the first signal propagation characteristic comprises measuring a baseband response between the primary reference antenna and the secondary reference antenna.

5. The method of claim 4 wherein measuring the second signal propagation characteristic comprises measuring a baseband response between the secondary reference antenna and the second antenna within the first antenna array.

6. The method of claim 1 wherein measuring the first signal propagation characteristic comprises measuring a bi-directional baseband response between the primary reference antenna and the secondary reference antenna.

7. The method of claim 6 wherein measuring the second signal propagation characteristic comprises measuring a bi-directional baseband response between the secondary reference antenna and the second antenna within the first antenna array.

8. The method of claim 1 wherein selecting as the secondary reference antenna at least one antenna that is not within the first antenna array comprises selecting the secondary reference antenna from a plurality of antennas within a second antenna array.

9. An antenna reciprocity calibrator comprising:
a processor that:
    selects as a primary reference antenna at least a first antenna within a first antenna array;
    selects as a secondary reference antenna at least one antenna that is not within the first antenna array;
    measures at least a first signal propagation characteristic based on at least one signal wirelessly communicated between the primary reference antenna and the secondary reference antenna;
    measures at least a second signal propagation characteristic based on at least one signal wirelessly communicated between the secondary reference antenna and at least a second antenna within the first antenna array;
    determines at least a first calibration coefficient for the second antenna within the first antenna array based on at least the first signal propagation characteristic and the second signal propagation characteristic; and
    calibrates signal processing of the second antenna, the calibrating based on the first calibration coefficient.

10. The antenna reciprocity calibrator of claim 9 wherein the processor assigns a calibration coefficient to the primary reference antenna.

11. The antenna reciprocity calibrator of claim 10 wherein the processor normalizes the first calibration coefficient for the second antenna to the calibration coefficient assigned to the primary reference antenna.

12. The antenna reciprocity calibrator of claim 9 wherein the processor measures a baseband response between the primary reference antenna and the secondary reference antenna.

13. The antenna reciprocity calibrator of claim 12 wherein the processor measures a baseband response between the secondary reference antenna and the second antenna within the first antenna array.

14. The antenna reciprocity calibrator of claim 9 wherein the processor measures a bi-directional baseband response between the primary reference antenna and the secondary reference antenna.

15. The antenna reciprocity calibrator of claim 14 wherein the processor measures a bi-directional baseband response between the secondary reference antenna and the second antenna within the first antenna array.

16. The antenna reciprocity calibrator of claim 9 wherein the processor selects the secondary reference antenna from a plurality of antennas within a second antenna array.

* * * * *